United States Patent
Tsai et al.

(10) Patent No.: US 8,685,168 B2
(45) Date of Patent: Apr. 1, 2014

(54) METHOD FOR REMOVING MICRO-DEBRIS AND DEVICE OF THE SAME

(75) Inventors: Wu-Jung Tsai, Hsinchu (TW); Chung-Wei Cheng, Hsinchu (TW); Mi-Ching Tsai, Hsinchu (TW); Wu-Sung Yao, Hsinchu (TW); Sheng-He Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 29 days.

(21) Appl. No.: 13/421,619

(22) Filed: Mar. 15, 2012

(65) Prior Publication Data
US 2012/0167915 A1 Jul. 5, 2012

Related U.S. Application Data

(62) Division of application No. 12/323,905, filed on Nov. 26, 2008, now abandoned.

(30) Foreign Application Priority Data

Jun. 6, 2008 (TW) ................................ 97121057 A

(51) Int. Cl.
*B01D 49/00* (2006.01)
(52) U.S. Cl.
USPC ............................................... 134/1; 134/1.3
(58) Field of Classification Search
USPC ....................................................... 134/1, 1.3
See application file for complete search history.

(56) References Cited

U.S. PATENT DOCUMENTS

| | | | |
|---|---|---|---|
| 3,371,233 A | | 2/1968 | Cook |
| 3,572,352 A | | 3/1971 | Koopman |
| 3,795,358 A | | 3/1974 | Sarnacki et al. |
| 4,006,707 A | | 2/1977 | Denslow |
| 4,120,699 A | | 10/1978 | Kennedy, Jr. et al. |
| 4,284,403 A | | 8/1981 | Rey |
| 4,565,557 A | | 1/1986 | Naumann et al. |
| 4,981,425 A | | 1/1991 | Lierke et al. |
| 5,036,944 A | * | 8/1991 | Danley et al. .................. 181/0.5 |
| 5,201,305 A | | 4/1993 | Takeuchi |
| 5,225,089 A | | 7/1993 | Benes et al. |
| 5,725,482 A | | 3/1998 | Bishop |
| 5,902,489 A | * | 5/1999 | Yasuda et al. .............. 73/863.21 |

(Continued)

FOREIGN PATENT DOCUMENTS

| | | | |
|---|---|---|---|
| JP | 01-192123 | * | 8/1989 |
| JP | 01-192123 A | | 8/1989 |

(Continued)

OTHER PUBLICATIONS

English Translation of JP 01192123.*

*Primary Examiner* — Michael Kornakov
*Assistant Examiner* — Caitlin N Dunlap
(74) *Attorney, Agent, or Firm* — Rabin & Berdo, P.C.

(57) ABSTRACT

The present invention provides a method for removing micro-debris generated in a laser machining process operated on machined object and device of the same. The machined object is placed on a movable machining platform within a machining range and machined at a particular machining location. By disposing an acoustic wave generator and a reflector part, or by disposing a plurality of acoustic wave generators, at least two standing waves extending across the machining range and two standing wave nodes are generated. The micro-debris generated from the laser machining process is moved away by the standing waves to concentrate at the standing wave nodes, and subsequently removed from the standing wave nodes.

8 Claims, 2 Drawing Sheets

(56) References Cited

U.S. PATENT DOCUMENTS

| | | | |
|---|---|---|---|
| 6,065,949 A | 5/2000 | Kuklinski | |
| 6,245,677 B1 | 6/2001 | Haq | |
| 6,311,702 B1 | 11/2001 | Fishkin | |
| 6,391,067 B2 | 5/2002 | Yanagita et al. | |
| 6,797,919 B1 | 9/2004 | Millard et al. | |
| 7,200,493 B2 | 4/2007 | Nilsson et al. | |
| 2007/0017441 A1 | 1/2007 | Stauch et al. | |

FOREIGN PATENT DOCUMENTS

| | | | |
|---|---|---|---|
| JP | 02-097500 A | | 4/1990 |
| JP | 04-013916 | * | 6/1992 |
| JP | 04-163916 A | | 6/1992 |
| JP | 06-333906 A | | 12/1994 |
| JP | 06-343933 A | | 12/1994 |
| JP | 10-291084 | * | 11/1996 |
| JP | 09-157088 | * | 6/1997 |
| JP | 09-201684 A | | 8/1997 |
| JP | 10-291084 A | | 11/1998 |
| JP | 11-080968 A | | 3/1999 |
| JP | 2001-287368 A | | 10/2001 |
| JP | 2005-131 602 A | | 5/2005 |
| JP | 09-157088 | | 6/2013 |
| WO | WO-02/072236 A1 | | 9/2002 |

* cited by examiner

METHOD FOR REMOVING MICRO-DEBRIS AND DEVICE OF THE SAME

CROSS-REFERENCE TO RELATED APPLICATION

This is a division of U.S. application Ser. No. 12/323,905 filed Nov. 26, 2008, which claimed Priority from Taiwanese application No. 97121057, filed Jun. 6, 2008, the entire disclosure of which is incorporated herein by reference.

BACKGROUND OF THE INVENTION

1. Field of the Invention

This invention generally relates to a technique for removing micro-debris, and more specifically, to a method for removing micro-debris generated in laser machining processes performed on machined objects and device of the same.

2. Description of Related Art

Along with the development in semiconductor and microsystem technologies, developments of various electronic products are toward higher memory capacities and higher performances; therefore requirements of component parts of electronic products are toward higher precision and miniaturization. Prior semiconductor fabrication technique is integrated with photolithography and etching technologies for producing fine line structures and patterns; and since laser machining is capable of performing micro drilling, micro cutting, micro carving, micro machining, micro soldering, etc., laser machining has been commonly used to replace some of conventional semiconductor fabrication technologies.

Accordingly, one feature of laser machining is providing excellent laser beam parallelism, theoretically, particle diameter thereof can be bunched together to under 1 μm, and temperature can reach above 10000° C., and it is capable of performing very microscopic melting and vaporization machining processes without affecting mechanical and thermomagnetic properties of nearby materials. However, in a process of laser micromachining performed on machined object, ablated micro-debris will scatter all over the surroundings of the machined object, and the micro-debris will even accumulate on the machined object if not removed instantly, subsequently decreasing machining precision and increase surface roughness.

According to established micro-debris removal technologies, air flow is mostly adopted to eliminate micro-debris, such as air blowing, air suction, and a combination of both, etc.. An example of related technology is disclosed by U.S. Pat. No. 6,797,919.

According to the U.S. Pat. No. 6,797,919, a laser ablation nozzle assembly is disclosed; said patent is characterized by disposing a laser channel for vacuum removing micro-debris, the laser channel comprises internal threads and is targeting directly at the machined object. Such internal threads enable air flow entering the laser channel via the vacuum channel to cause a turbulent flow effect for removing micro-debris generated during the machining process. In addition, said technology can further dispose an air pressure channel inside the nozzle for forming an air flow circuit, thereby preventing the micro-debris from attaching onto the laser channel above the machined object and affecting proper laser performance.

However, when using air flow to remove micro-debris, air blowing nozzle or air suction nozzle should be disposed properly and also air flow direction has to be well controlled, but the air blowing nozzle or air suction nozzle cannot be adjusted easily since it is disposed closely to the laser beam, thereby causing micro-debris to be removed incompletely or flow to improper location. Meanwhile, temperature is one of important parameters in laser machining, while removing micro-debris by means of air blowing, air suction, or both, turbulent flow will cause uneven temperature in neighboring areas of the machining location, and when the temperature or temperature difference is too high, precision and quality of laser machining are decreased, or even worse, the process of micro-debris ablation cannot be performed normally.

In addition, said patent technology has to be disposed with air pressure source or negative pressure source for correspondingly supporting the air blowing nozzle or air gushing nozzle to remove micro-debris, which not only increases cost, but also occupies more space and causes more inconvenience during use. Besides, said patent technology has to be operated in a vacuum environment, equipments necessary to implement this are usually very expensive.

Furthermore, said patent technology involves a machining method using laser beam to operate on machined object. Therefore, a machining platform carrying the machined object is moved to facilitate machining range. However, when laser direct writing technique is applied to perform a machining process, in order to adjust the machining range, the focus of the laser beam is constantly adjusted through optical component such as a lens. As a result, if said patent technology is applied, location of the air blowing nozzle or air gushing nozzle should be changed correspondingly as well, thereby causing difficulty in removing micro-debris; in other words, said patent technology is not applicable to the laser direct writing technique.

In addition, an acoustic levitation and methods for manipulating levitated objects are disclosed according to U.S. Pat. No. 4,284,403, said patent technology uses acoustic levitation to manipulate levitated objects; said patent is characterized by disposing a vibrator and an amplifier below levitated objects capable of generating acoustic waves, and also disposing an acoustic wave reflector above the levitated objects, consequently, acoustic waves generated by the source will be reflected by the acoustic wave reflector. Interference between the sound waves and the reflected waves will further generate standing waves and standing wave nodes. Acoustic levitation occurs at these standing wave nodes, thereby enabling levitated objects to float at the standing wave nodes. In addition, according to said patent technology, the acoustic wave reflector is connected to a movable platform, by moving the acoustic wave reflector, the standing waves and standing wave nodes are also moved, therefore, the levitated objects are also moved.

However, said patent technology does not discuss how to remove micro-debris produced in a laser machining process. A supplementary technique of standing waves and standing wave nodes is disclosed according to U.S. Pat. Nos. 4,284,403. 7,200,493 discloses a technology, wherein molecules are concentrated at standing wave nodes and then sieved. Likewise, U.S. Pat. No. 4,284,403 is applicable to no-container high purity filtering technology for glass optical fiber, while U.S. Pat. No. 7,200,493 is applicable to technology for sieving crystalline state or non-crystalline state of molecules, neither mentions how to remove micro-debris generated in a laser machining process. Therefore, even similar principles are applied, there is no mention of removal of micro-debris during laser machining Hence, it is a highly urgent issue in the industry to provide a method for removing micro-debris produced in laser machining processes and device of the same capable of effectively solving abovementioned drawbacks of the prior art.

SUMMARY OF THE INVENTION

In view of the disadvantages of the prior art mentioned above, it is a primary objective of the present invention to provide a micro-debris removal method and a device of the same, which are capable of effectively removing micro-debris.

It is another objective of the present invention to provide a micro-debris removal method and a device of the same, which is capable of enhancing machining precision.

It is a further objective of the present invention to provide a micro-debris removal method and a device of the same, which is easy to operate.

To achieve the aforementioned and other objectives, a micro-debris removal device is provided according to the present invention. The micro-debris removal device is applicable for removing micro-debris produced in a laser machining process performed on machined object placed on a movable machining platform within a machining range, thereby performing machining process on a machining location.

In one embodiment, the micro-debris removal device comprises: an acoustic wave generator, which is disposed at the peripheral of the machining range for generating acoustic waves; and a reflecting part, which is disposed opposite to the acoustic wave generator for reflecting the generated acoustic waves to produce reflected waves, thereby allowing the acoustic waves and the reflected waves together to generate at least two standing waves and two standing wave nodes. The range of the standing waves extends across the machining range, and the micro-debris is concentrated to the standing wave nodes.

In said micro-debris removal device, the acoustic wave generator selectively comprises an oscillating component and an amplifying component connected with the oscillating component; the amplifying component is opposite to the reflecting part, the reflecting part is either a reflecting wall or a reflecting surface. Optionally, an acoustic wave generator and a corresponding reflecting part can be provided for generating an acoustic wave and a reflected wave; or a plurality of the acoustic wave generators and a plurality of corresponding reflecting parts can be provided for generating a plurality of acoustic waves and a plurality of reflected waves.

In another embodiment, the micro-debris removal device can also comprises: a first acoustic wave generator, which is symmetrically disposed at the peripheral of the machining range for generating first acoustic waves; and a second acoustic wave generator, which is disposed at the peripheral of the machining range opposite to the first acoustic wave generator for generating second acoustic waves, wherein the first acoustic wave and the second acoustic wave generates at least two standing waves and two standing wave nodes so as to concentrate the micro-debris to the standing wave nodes.

In said micro-debris removal device, each of the first and the second acoustic wave generators comprises an oscillating component and an amplifying component connected with the oscillating component. The amplifying components of the first and the second acoustic wave generators are disposed face to face. In such embodiment, the device can further comprise: a third acoustic wave generator disposed at the peripheral of the machining range, and a reflecting part disposed opposite to the third acoustic wave generator for generating acoustic waves and reflected waves, wherein the reflecting part is either a reflecting wall or a reflecting surface.

In said various embodiments, preferably, the standing wave nodes are located outside the machining range, outside the machined objects or outside the machining location.

A micro-debris removal method is also provided according to the present invention, wherein at least two standing waves extending across the machining range and two standing wave nodes can be formed, and the standing waves are used to move and concentrate the micro-debris to the standing wave nodes, and then the micro-debris is removed from the standing wave nodes.

In an embodiment of the present invention, the micro-debris removal method comprises a step of forming acoustic waves and reflected waves within the machining range, thereby enabling the acoustic waves and the reflected waves to form the at least two standing waves extending across the machining range and the two standing wave nodes, wherein the locations of the standing wave nodes are determined by adjusting at least one of the frequency and phase of the acoustic waves. In another embodiment, the method can also comprise a step of forming first and second acoustic waves within the machining range, and then enabling the first and the second acoustic waves to form the at least two standing waves extending across the machining range and the two standing wave nodes, wherein the locations of the standing wave nodes are determined by adjusting at least one of the frequency and phase of at least one of the first and second acoustic waves.

In said micro-debris removal method, step of removing the micro-debris from the standing wave nodes is done selectively by means of either sucking away the micro-debris or stopping forming the at least two standing waves across the machining range and the two standing wave nodes, thereby enabling the micro-debris to drop off from the standing wave nodes to outside the machining range. In other words, various approaches can be used for removing the micro-debris.

The micro-debris removal method and device of the present invention are characterized by designing standing waves to be capable of extending across the entire machining surface, and then moving and concentrating the micro-debris by the standing waves to standing wave nodes located outside the machining range, subsequently removing the micro-debris from the standing wave nodes, thereby effectively removing the micro-debris away from the machining range, and comparatively solving drawbacks of prior art. Air flow can be used to remove the micro-debris. In addition, after concentrating the micro-debris at the standing wave nodes, at any stage of the machining process, after, during, or when the acoustic wave generator is stopped, the micro-debris can be removed by air suction, dropping off due to gravity of the micro-debris, or gravity guiding etc.. Accordingly, the present invention is capable of not only preventing drawbacks of prior art, wherein micro-debris is deposited at the machining location and thus decreasing machining precision, but also comparatively enhancing the machining precision, providing easy operation, and accommodating to various laser machining technologies that may involve movement of the machining platform and the laser source.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
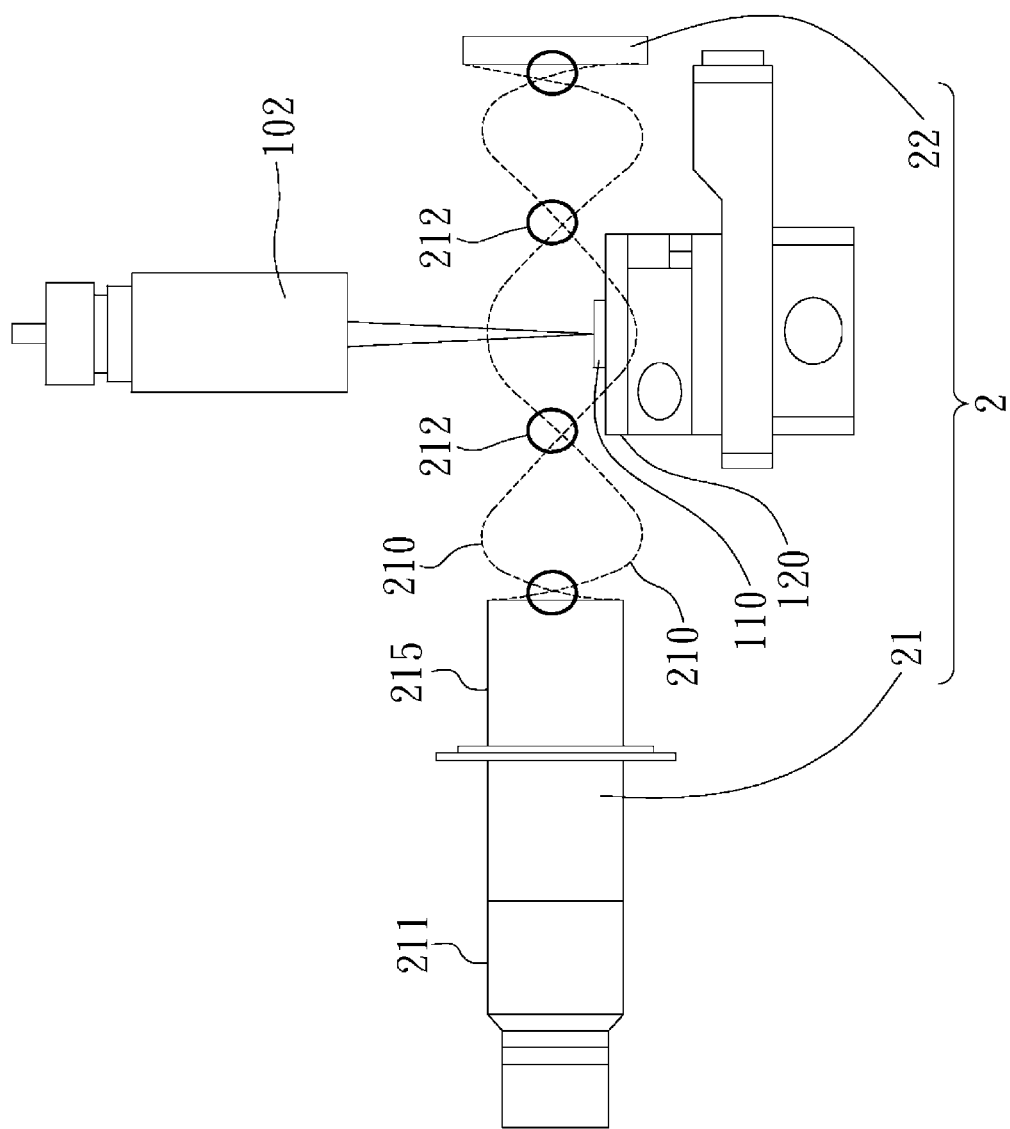
FIG. 1 is a diagram illustrating a first embodiment of method and device of the present invention for removing micro-debris.

Please refer to FIG. 1, which is a diagram illustrating a first embodiment of method and device of the present invention for removing micro-debris; as shown in the FIG., the present invention is for removing micro-debris generated during a laser machining process performed on a machined object 110, the machined object 110 is placed on a movable machining platform 120 within a machining range, thereby performing machining on a machining location.

It should be noted herein, in the present embodiment, a laser source 102 of a laser machining system is adopted to perform laser machining on the machined object 110. The laser source 102 is located right above the machined object 110 and radiates laser light beam, for example. Laser machining is only for illustrating purpose of the present invention and not to limit the present invention in any way. Other machining approaches are equally applicable to the present invention. In addition, principle and performance related to the laser machining are prior knowledge are not described in details, since they are well known to those skilled in the art and are not the features of the present invention.

In the present embodiment, a micro-debris removal device 2 comprises an acoustic wave generator 21 and a reflecting part 22 disposed oppositely to the acoustic wave generator 21. The micro-debris removal device 2 is simply an ordinary power source; neither a particular air pressure source nor a negative pressure source is required.

The acoustic wave generator 21 is located at peripheral of the machining range for generating acoustic waves. In the present embodiment, the acoustic wave generator 21 is parallel to the machining platform 120, but the acoustic wave generator can also be disposed at any level without being parallel to the machining platform 120, and can also be disposed on a level that is at any angle with the machining platform 120 as needed. In addition, the acoustic wave generator 21 comprises an oscillating component 211 and an amplifying component 215 connected with the oscillating component 211. The oscillating component 211 can be an oscillator disposed at one end of the acoustic wave generator 21, and the amplifying component 215 is disposed oppositely to the reflecting part 22 and located at the other end of the acoustic wave generator 21.

The reflecting part 22 can be a reflecting wall or a reflecting surface, which is disposed oppositely to the acoustic wave generator 21 for reflecting the acoustic waves and then generating reflected waves. In the present embodiment, the acoustic waves of the acoustic wave generator 21 are reflected by the reflecting part 22 to form the reflected waves, the acoustic waves and the reflected waves are formed within the machining range of the machined object 110. After interference, two standing waves 210 and two standing wave nodes 212 located at intersections of the two standing waves are formed. The range of the standing waves 210 extends across the machining range for removing micro-debris by concentrating them at the standing wave nodes 212.

It should be noted here that the standing wave nodes 212 of the present embodiment are located outside the machining range, but not restricted to as stated herein. In other embodiments, the standing wave nodes 212 can be located outside the machined object 110, outside the machining location, or any other location causing no interruption to the machining process. In addition, location of the standing wave nodes can be determined by adjusting the frequency and phase of the acoustic waves, and this is well known to those in the art, therefore, no detailed description is given hereafter.

In addition, as shown in FIG. 1, the micro-debris removal device 2 is not disposed inside the laser machining system but an independent device. However, in other embodiments, the micro-debris removal device 2 can be integrated into the laser machining system; for instance, disposing the acoustic wave generator 21 and the reflecting part 22 separately at opposite sides of the machining platform 120; or, disposing the acoustic wave generator 21 and the reflecting part 22 at different components of the laser machining system; or, disposing a reflecting wall, a reflecting surface, or other equivalent structure capable of reflecting acoustic waves at the machining platform 120 for serving as the reflecting part 22. In other words, any design is applicable to the present invention, as long as the reflecting part 22 is disposed oppositely to the acoustic wave generator 21 for reflecting the acoustic waves to produce reflected waves, the acoustic waves and the reflected waves producing at least two standing waves 210 and two standing wave nodes 212, and range of the standing waves extending across the machining range so as to remove by the micro-debris by concentrating them to the standing wave nodes 212.

When the machined object 110 is placed on the machining platform 120 and the laser source 102 is used to perform laser micromachining on the machined object 110, micro-debris ablated from material due to laser operation is sputtered around the machined object 110. By the characteristics of acoustic levitation, the micro-debris can be taken away from machining range of the machined object 110 through forces of the standing waves 210. Meanwhile, the micro-debris is removed from the machining location and concentrated to the standing wave nodes 212 outside the machining range of the machined object 110. Accordingly, the micro-debris can be removed at any stage of the machining process, e.g., at the end of the machining process, at any interval of the machining process, or when the acoustic wave generator 21 is stopped operating.

For instance, at the end of the machining process, at interval of machining process, or when the acoustic wave generator 21 is stopped operating, the micro-debris is removed by means of air suction, e.g. using a dust suction device (not shown in the FIG.). Since now the micro-debris is outside the machining range of the machined object 110, it is convenient to suck away the micro-debris by using the dust suction device during the machining process without affecting the surface temperature of the machined object 110. Alternatively, one can choose to turn off the acoustic wave generator 21 to stop forming the standing wave 210 covering the machining range and the standing wave nodes 212, thereby allowing the micro-debris to drop from the standing wave nodes 212 to outside the machining range, and can then conveniently gather and remove the micro-debris.

Furthermore, since these standing waves are formed across the machining range of the machined object 110, by adjusting at least one of frequency and phase of the acoustic waves, locations of the standing wave nodes can be selected, provided that the locations of the standing wave nodes do not affect the operation performed at the machining location. As such, the micro-debris removal process will not be affected by the movement of the machining platform 120 or the laser source 102; namely, the present invention is also applicable to the laser direct writing technique, in addition to that illustrated in the present embodiment.

In other words, by simply forming at least two standing waves covering the machining range and two standing wave nodes, and using forces of the standing waves to concentrate the micro-debris to the standing wave nodes, the micro-debris can be easily removed from the standing wave nodes without affecting the machining process.

Figure 2:
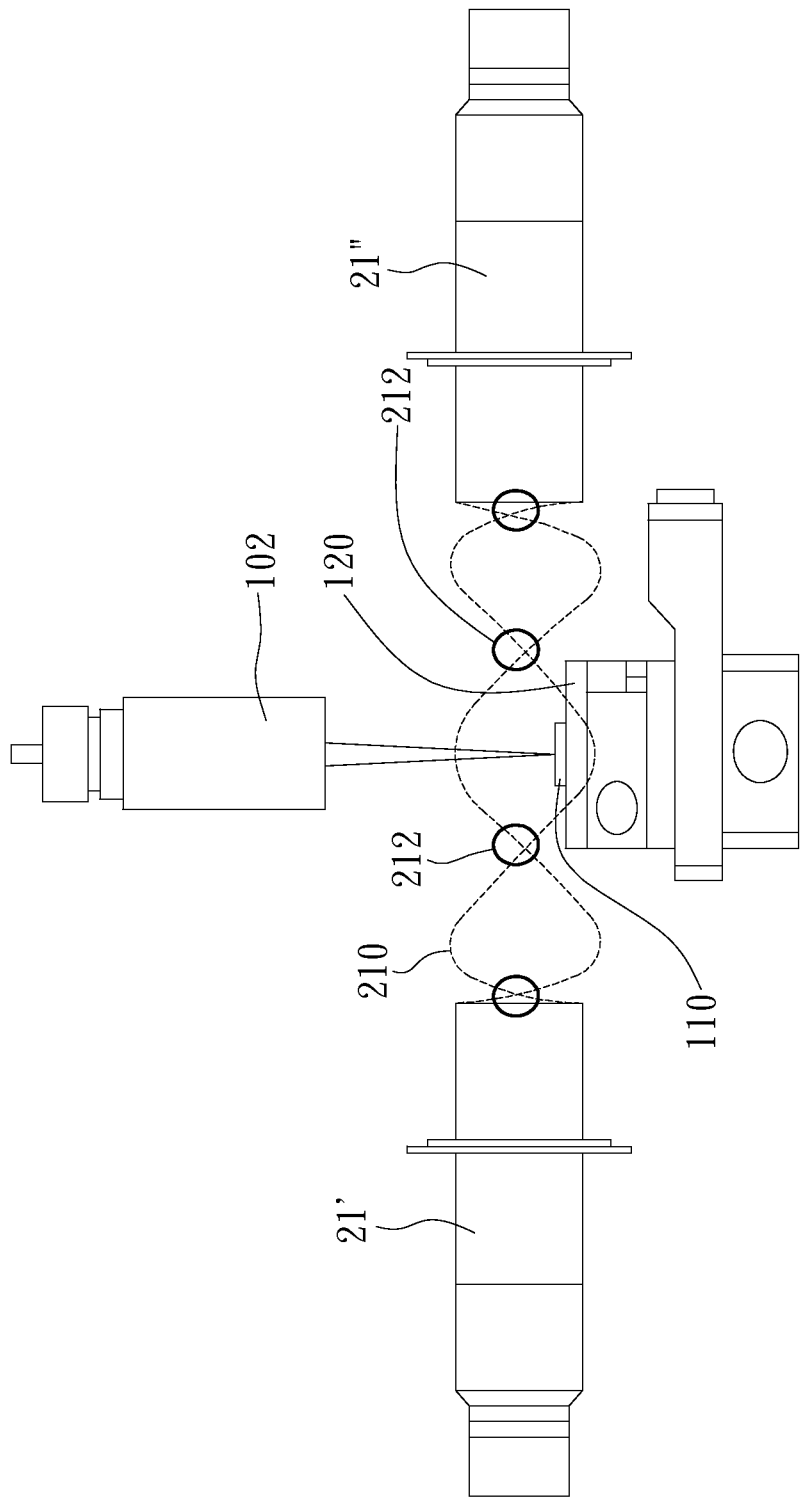
FIG. 2 is a diagram illustrating a second embodiment of method and device of the present invention for removing micro-debris.

Please refer to FIG. 2, which is a second embodiment of method and device of the present invention for removing micro-debris; wherein the same or similar components as in the first embodiment are designated with the same or similar labels, and no repeated detailed description is given hereafter.

The main difference of the present embodiment from the first embodiment is that one pair of acoustic wave generators are disposed according to the present embodiment, rather than an acoustic wave generator and a reflecting part.

As shown in FIG. 2, the micro-debris removal device of the present embodiment comprises: a first acoustic wave generator 21' symmetrically disposed at the peripheral of the machining range for generating first acoustic waves; and a second acoustic wave generator 21" disposed oppositely to the first acoustic wave generator 21' at the peripheral of machining range for generating second acoustic waves, thereby enabling the first and the second acoustic wave generators to similarly produce at least two standing waves 210 and two standing wave nodes 212 for concentrating micro-debris to the standing wave nodes 212, which can then be subsequently removed.

In the present embodiment, each of the first and the second acoustic wave generator 21' and 21" comprises an oscillating component 211 and an amplifying component 215 connected with the oscillating component 211 as shown in the first embodiment; the difference being, the amplifying components 215 of the first and the second acoustic wave generators 21' and 21" are disposed face to face, thereby enabling the first and the second acoustic wave generators 21' and 21" to produce two standing waves 210 extending across the machining range and two standing wave nodes 212. The locations of the standing wave nodes 212 can be determined by adjusting at least one of the frequency and phase of at least one of the first and the second acoustic waves. By adopting this kind of arrangement, levitation forces of acoustic waves can be enhanced, while still forming at least two standing waves extending across the machining range and two standing wave nodes. Regardless of the movement of the machining platform 120 or the laser source 102, forces of the standing waves 210 can be used to take away and concentrate the micro-debris to the standing wave nodes 212, and the micro-debris can be subsequently removed from the standing wave nodes 212.

It should be noted that a plurality of corresponding acoustic wave generators or a plurality of pairs of assembly of acoustic wave generator and reflecting part may be provided around the peripheral of the machining platform 120. Also, disposition position thereof does not necessarily have to be horizontal, rather can be at various angles as needed. In addition, the present invention is not limited to the number of acoustic wave generators that can be provided. For example, a third acoustic wave generator can be similarly disposed at the peripheral of the machining range and a reflecting part oppositely to the third acoustic wave generator for producing acoustic waves and reflected waves, where the components are disposed in the same way as that shown in the first embodiment and thus not further described.

Compared with the prior art, the micro-debris removal method and device of the present invention are characterized by disposing a plurality of acoustic wave generators around the peripheral of a laser machining platform. By using a plurality of acoustic waves or acoustic waves and reflected waves to form standing waves across the machining range of machined object and standing wave nodes, consequently providing practical and easy operation while avoiding drawbacks of prior art using air flow to remove micro-debris, and thus enhancing the machining precision. In addition, the standing waves cover up the entire machining area, thereby solving drawbacks of prior art, in which micro-debris removal would be affected by the movement of the machining platform or the laser source. Besides, the present invention requires simply an ordinary power source, there is no need for a particular air pressure source or a negative pressure source. Furthermore, the present invention is capable of applying well-developed acoustic levitation technologies, expanding application scope thereof, and providing a means for removing micro-debris generated during laser machining, thereby providing high practical value for industrial applications.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A micro-debris removal method for removing micro-debris generated during a machining process performed on a machined object, the machined object being placed on a movable machining platform within a machining range and machined at a machining location, and the micro-debris removal method comprising:
    forming at least two standing waves extending across the machining range and at least two standing wave nodes located outside the machining range;
    concentrating the micro-debris to the at least two standing wave nodes by the standing waves; and
    removing the micro-debris from the at least two standing wave nodes.

2. The micro-debris removal method of claim 1, further comprising a step of forming acoustic waves and reflected waves within the machining range, in the forming at least two standing waves, the acoustic waves and the reflected waves form the at least two standing waves extending across the machining range and the two standing wave nodes.

3. The micro-debris removal method of claim 2, wherein locations of the standing wave nodes are determined by adjusting at least one of a frequency and a phase of the acoustic waves.

4. The micro-debris removal method of claim 1, further comprising a step of forming first and second acoustic waves within the machining range, which then, in the forming at least two standing waves, form the at least two standing waves extending across the machining range and the two standing wave nodes.

5. The micro-debris removal method of claim 4, wherein locations of the standing wave nodes are determined by adjusting at least one of a frequency and a phase of at least one of the first and second acoustic waves.

6. The micro-debris removal method of claim 1, wherein in the step of removing the micro-debris from the at least two standing wave nodes, the micro-debris is removed by means of suction.

7. The micro-debris removal method of claim 1, wherein in the step of removing the micro-debris from the at least two standing wave nodes, the formation of the at least two standing waves extending across the machining range and the two standing wave nodes are stopped, thereby enabling the micro-debris to drop off from the standing wave nodes to outside the machining range.

8. The micro-debris removal method of claim 1, further comprising performing a laser machining, that is the machining process, on the machined object using a laser machine.

* * * * *